United States Patent
Vo

(10) Patent No.: US 10,633,725 B2
(45) Date of Patent: Apr. 28, 2020

(54) ALUMINUM-IRON-ZIRCONIUM ALLOYS

(71) Applicant: NanoAL LLC, Skokie, IL (US)

(72) Inventor: Nhon Q. Vo, Skokie, IL (US)

(73) Assignee: NaneAL LLC, Skokie, IL (US)

( * ) Notice: Subject to any disclaimer, the term of this patent is extended or adjusted under 35 U.S.C. 154(b) by 337 days.

(21) Appl. No.: 15/517,865

(22) PCT Filed: Oct. 14, 2016

(86) PCT No.: PCT/US2016/057098
§ 371 (c)(1),
(2) Date: Apr. 7, 2017

(87) PCT Pub. No.: WO2017/066609
PCT Pub. Date: Apr. 20, 2017

(65) Prior Publication Data
US 2017/0306452 A1    Oct. 26, 2017

Related U.S. Application Data

(60) Provisional application No. 62/241,543, filed on Oct. 14, 2015.

(51) Int. Cl.
| | |
|---|---|
| *C22C 21/00* | (2006.01) |
| *C22F 1/04* | (2006.01) |
| *C21D 1/25* | (2006.01) |
| *B23K 35/28* | (2006.01) |
| *B23K 35/02* | (2006.01) |
| *H01B 1/02* | (2006.01) |
| *B23K 35/40* | (2006.01) |
| *H01M 2/10* | (2006.01) |
| *H01M 2/20* | (2006.01) |

(52) U.S. Cl.
CPC .......... *C22C 21/00* (2013.01); *B23K 35/0227* (2013.01); *B23K 35/288* (2013.01); *B23K 35/40* (2013.01); *C21D 1/25* (2013.01); *C22F 1/04* (2013.01); *H01B 1/023* (2013.01); *H01M 2/1077* (2013.01); *H01M 2/206* (2013.01); *H01M 2220/20* (2013.01)

(58) Field of Classification Search
CPC ...................................................... C22C 21/00
See application file for complete search history.

(56) References Cited

U.S. PATENT DOCUMENTS

| | | |
|---|---|---|
| 3,551,143 A | 12/1970 | Marukawa et al. |
| 3,807,969 A | 4/1974 | Schoerner et al. |
| 3,958,987 A | 5/1976 | Chia et al. |

(Continued)

FOREIGN PATENT DOCUMENTS

| | | |
|---|---|---|
| CN | 101418401 A | 4/2009 |
| CN | 101770828 A | 7/2010 |

(Continued)

OTHER PUBLICATIONS

Alabin A.N., Belov N.A. (2012) Effect of Iron and Silicon on Strength and Electrical Resistivity of Al—ZR Wire Alloys. In: Welland H., Rollett A.D., Cassada W.A. (eds) ICAA13.*

(Continued)

*Primary Examiner* — Anthony J Zimmer
*Assistant Examiner* — Ricardo D Morales

(57) ABSTRACT

Aluminum-Iron-Zirconium alloys that exhibit improved electrical and mechanical properties.

24 Claims, 2 Drawing Sheets

(56) References Cited

U.S. PATENT DOCUMENTS

| | | | |
|---|---|---|---|
| 4,580,713 | A | 4/1986 | Sekibata et al. |
| 4,845,543 | A | 7/1989 | Okikawa et al. |
| 4,908,078 | A | 3/1990 | Muramatsu et al. |
| 5,087,301 | A | 2/1992 | Angers et al. |
| 5,327,955 | A | 7/1994 | Easwaran |
| 5,449,421 | A | 9/1995 | Hamajima et al. |
| 5,976,214 | A | 11/1999 | Kondoh et al. |
| 5,976,278 | A | 11/1999 | Sircar |
| 6,149,737 | A | 11/2000 | Hattori et al. |
| 6,592,687 | B1 | 7/2003 | Lee et al. |
| 6,736,911 | B1 | 5/2004 | Ro et al. |
| 6,918,970 | B2 | 7/2005 | Lee et al. |
| 7,015,395 | B2 | 3/2006 | Goldsworthy et al. |
| 7,438,971 | B2 | 10/2008 | Bryant et al. |
| 7,671,565 | B2 | 3/2010 | Straubel et al. |
| 7,683,262 | B2 | 3/2010 | Guery et al. |
| 7,752,754 | B2 | 7/2010 | Goldsworthy et al. |
| 8,017,072 | B2 | 9/2011 | Pandey |
| 8,323,373 | B2 | 12/2012 | Haynes, III et al. |
| 8,371,028 | B2 | 2/2013 | Goldsworthy et al. |
| 8,500,926 | B2 | 8/2013 | Ichitani et al. |
| 8,778,099 | B2 | 7/2014 | Pandey |
| 9,453,272 | B2 | 9/2016 | Vo et al. |
| 10,450,637 | B2 | 10/2019 | Siripurapu et al. |
| 2003/0192627 | A1 | 10/2003 | Lee et al. |
| 2010/0143177 | A1 | 6/2010 | Pandey et al. |
| 2011/0017359 | A1 | 1/2011 | Pandey |
| 2012/0000578 | A1* | 1/2012 | Wang ............. C22C 21/02 148/549 |
| 2012/0186851 | A1 | 7/2012 | Winterhalter et al. |
| 2012/0261158 | A1 | 10/2012 | Daniel et al. |
| 2013/0058061 | A1 | 3/2013 | Satoh et al. |
| 2013/0199680 | A1 | 8/2013 | Apelian et al. |
| 2013/0220497 | A1* | 8/2013 | Huskamp ............ C22C 21/00 148/688 |
| 2014/0312283 | A1 | 10/2014 | Park et al. |
| 2015/0041914 | A1 | 2/2015 | Lang et al. |
| 2015/0132182 | A1 | 5/2015 | Comoret |
| 2015/0259773 | A1* | 9/2015 | Vo ............. C22F 1/04 148/549 |
| 2015/0279518 | A1 | 10/2015 | Comoret et al. |
| 2015/0279781 | A1 | 10/2015 | Kaibara et al. |
| 2016/0141585 | A1 | 5/2016 | Berg et al. |
| 2017/0058386 | A1 | 3/2017 | Vo et al. |
| 2017/0110704 | A1 | 4/2017 | Siripurapu et al. |
| 2017/0250003 | A1* | 8/2017 | Yoshida ............ C22C 21/00 |
| 2017/0306452 | A1 | 10/2017 | Vo |
| 2019/0153566 | A1 | 5/2019 | Siripurapu et al. |

FOREIGN PATENT DOCUMENTS

| | | |
|---|---|---|
| CN | 101914708 A | 12/2010 |
| CN | 102191423 A | 9/2011 |
| CN | 102230113 A | 11/2011 |
| CN | 102363849 A | 2/2012 |
| CN | 102610293 A | 7/2012 |
| CN | 102719709 A | 10/2012 |
| CN | 102816960 A | 12/2012 |
| CN | 102864344 A | 1/2013 |
| CN | 103886930 A | 6/2014 |
| CN | 104299673 A | 1/2015 |
| CN | 105369077 B | 3/2016 |
| CN | 105950893 A | 9/2016 |
| EP | 0 558 957 A2 | 9/1993 |
| EP | 2 241 644 A1 | 10/2010 |
| EP | 2 597 169 A1 | 5/2013 |
| EP | 2553131 B1 * | 6/2013 ............ C22C 21/08 |
| EP | 2 738 805 A1 | 6/2014 |
| EP | 2 902 517 A1 | 8/2015 |
| KR | 10-1712328 B1 | 3/2017 |
| RU | 2 446 222 C1 | 3/2012 |
| WO | WO 92/20830 | 11/1992 |
| WO | WO 2005/045080 A1 | 5/2005 |
| WO | WO 2011/122958 A1 | 10/2011 |
| WO | WO 2012/132280 A2 | 10/2012 |
| WO | WO 2014/064370 A1 | 5/2014 |
| WO | WO 2014/107112 A1 | 7/2014 |
| WO | WO 2015/003897 A1 | 1/2015 |
| WO | WO 2017/066609 A1 | 4/2017 |

OTHER PUBLICATIONS

Jan. 6, 2017 Transmittal of ISR and Written Opinoin of ISA for PCT/US2016/057098.
Non-Final Office Action dated May 4, 2016 for U.S. Appl. No. 14/645,654, 8 pages.
Non-Final Office Action dated Dec. 31, 2018 for U.S. Appl. No. 15/263,011, 5 pages.
Final Office Action dated Aug. 8, 2019 for U.S. Appl. No. 15/263,011, 7 pages.
Non-Final Office Action dated Jun. 28, 2018 for U.S. Appl. No. 15/294,273, 16 pages.
Final Office Action dated Nov. 20, 2018 for U.S. Appl. No. 15/294,273, 20 pages.
Extended European Search Report dated Feb. 15, 2017 for European Application No. 15760733.4, 9 pages.
Extended European Search Report dated Sep. 23, 2019 for European Application No. 19172652.0, 8 pages.
International Search Report and Written Opinion dated Jun. 25, 2016 for International Application No. PCT/US2015/020218, 14 pages.
Examination and Search Report dated May 9, 2019 for Chilean Application No. 201800935, with English translation, 21 pages.
Extended European Search Report dated Apr. 15, 2019 for European Application No. 16856316.1, 7 pages.
First Office Action and Search Report dated Jun. 11, 2019 for Chinese Application No. 201680059500, w/English translation, 18 pages.
Extended European Search Report dated Mar. 14, 2019 for European Application No. 16856300.5, 11 pages.
International Search Report and Written Opinion dated Mar. 21, 2019 for International Application No. PCT/US2018/063741, 10 pages.
International Search Report and Written Opinion dated Jan. 31, 2017 for International Application No. PCT/US2016/057142, 11 pages.
International Search Report and Written Opinion dated Jan. 31, 2019 for International Application No. PCT/US2018/062268, 7 pages.
Alabin, A. N. & Belov, N. A., Effect of Iron and Silicon on Strength and Electrical Resistivity of Al—Zr Wire Alloys, 2012 13th International Conference on Aluminum Alloys, In: Weiland H., Rollett A.D., Cassada W.A. (eds) ICAA13 Pittsburgh. Springer, Cham, pp. 1539-1544.
Belov, N. A. et al., "The Influence that a Zirconium Additive has on the Strength and Electrical Resistance of Cold-Rolled Aluminum Sheets," Russian Journal of Non-Ferrous Metals, 50(4):357-362 (2009).
Berezina, A. L. et al., "Decomposition Processes in the Anomalous Supersaturated Solid Solution of Binary and Ternary Aluminum Alloys Alloyed with Sc and Zr," Acta Physica Polonica A, 122(3):539-543 (2011).
Booth-Morrison, C. et al., "Effect of Er additions on ambient and high-temperature strength of precipitation-strengthened Al—Zr—Sc—Si alloys," Acta Mater, 60:3463-3654 (2012).
Booth-Morrison, C. et al., "Role of silicon in accelerating the nucleation of $Al_3$)Sc,Zr) precipitates in dilute Al—Sc—Zr alloys," Acta Mater, 60:4740-4752 (2012).
Booth-Morrison, C. et al., "Coarsening resistance at 400° C. of precipitation-strengthened AlZrScEr Alloys," Acta Mater, 59(18):7029-7042 (2011).
Cavaliere, P. & Cabibbo, M., "Effect of Sc and Zr additions on the microstructure and fatigue properties of AA6106 produced by equal-channel-angular-pressing," Materials Characterization, 59:197-203 (2008).

(56) References Cited

OTHER PUBLICATIONS

Dalin, J. et al., "Novel Aluminium/Copper Fibre-Reinforced Bonding Wires for Power Electronics," 2006 1st Electronic Systemintegration Technology Conference, vol. 2, IEEE, 5 pages.
Fuller, C. B. et al., "Temporal evolution of the nanostructure of Al(Sc,Zr) alloys: Part 1—Chemical compositions of $Al_3(Sc_{1-x}Zr_x)$ precipitates," Acta Mater, 53:5401-5413 (2005).
Hallem, H. et al., "The formation of $Al_3(Sc_xZryHf_{1-x-y})$ dispersoids in aluminum alloys," Mater Sci Eng A, 421:154-160 (2006).
Hori, S. et al., "Effect of small addition of Si on the precipitation of Al—0.6%Zr Alloys," J Jpn Inst Light Met, 28:79-84 (1978).
Huang, H. et al., "Age Hardening Behavior and Corresponding Microstructure of Dilute Al—Er—Zr Alloys," Metallurgical and Materials Transactions A, 44A:2849-2856 (2013).
Ikeda, T. et al., "Effect of Si content on precipitation behavior of Al—Zr—Fe—Si alloy wire rods produced by Properzi process," Retrieved from the Internet on Mar. 5, 2019 at https://www.jstage.jst.go.jp/article/jilm1951/45_8_441/_article/-char/ja/, 6 pages (1995).
Jain, V. K. et al., "Micromanufacturing: A Review—Part II," Journal of Engineering Manufacture, 228(9):995-1014 (2014).
Knipling, K. E. et al., "Criteria for developing castable, creep-resistant aluminum-based alloys—A Review," Z Metallkd, 97:246-265 (2006).
Knipling, K. E. et al., "Atom Probe Tomographic Studies of Precipitation in Al—0.1Zr—0.1Ti (at.%) Alloys," Microscopy and Microanalysis, 13:1-14 (2007).
Knipling, K. E. et al., "Nucleation and Precipitation Strengthening in Dilute Al—Ti and Al—Zr Alloys," Metallurgical and Materials Transactions A, 38A:2552-2563 (2007).
Knipling, K. E. et al., "Creep resistance of cast and aged Al—0.1Zr and Al—0.1Zr—0.1Ti (at.%) alloys at 300-400° C.," Scrpta Materialia, 59:387-390 (2008).
Knipling, K. E. et al., "Precipitation evolution in Al—Zr and Al—Zr—Ti alloys during isothermal aging at 375-425° C.," Acta Mater, 56:114-127 (2008).
Knipling, K. E. et al., "Precipitation evolution in Al—Zr and Al—Zr—Ti alloys during isothermal aging at 450-600° C.," Acta Mater, 56:1182-1195 (2008).
Knipling, K. E. et al., "Precipitation evolution in Al—0.1Sc, Al—0.1Zr and Al—0.1Sc—0.1Zr (at.%) alloys during isochronal aging," Acta Mater, 58:5184-5195 (2010).
Knipling, K. E. et al., "Ambient- and high-temperature mechanical properties of isochronally aged Al—0.06Sc, Al—0.06Zr and Al—0.06Sc—0.06Zr (at.%) alloys," Acta Mater, 59:943-954 (2011).
LeClaire, A. D. et al., "3.2.13 Aluminum group metals," Diffusion in Solid Metals and Alloys (H. Mehrer (Ed.)), Springer Materials—Landolt-Börnstein—Group III condensed Matter, 26:151-156 (1990).
Li, H. et al., "Precipitation and evolution and coarsening resistance at 400° C. of Al microalloyed with Zr and Er," Scr Mater, 67:73-76 (2012).
McCullough, C., "Thermal Aging Behavior and Lifetime Modeling for Aluminum-Zirconium Alloy used in AACR," Technical Information, 3M, Composite Conductor Al—Zr Alloy Wire, Jun. 8, 2006, 8 pages.
Ohashi, T. et al., "Effect of Fe and Si on age hardening properties of supersaturated solid solution of Al—Zr," J Jpn. Inst Met, 34:604-640 (1970).
Piwowarska-Uliasz, M. et al., "Research into the aluminum-zirconium alloys dedicated for electrical purposes," Key Engineering Materials, 641:47-55 (2015).
Qiao, X. G., Ph.D. Dissertation—"Development of a Fabrication Process for a MEMS Component from Ultra Fine Grained Alloys," University of Southampton, Faculty of Engineering, Science and Mathematics, Feb. 2010, 222 pages.
Riddle, Y. W. et al., "A Study of Coarsening, Recrystallization, and Morphology of Microstructure in Al—Sc—(Zr)—(Mg) Alloys," Metallurgical and Materials Transactions A, 35A:341-350 (2004).
Sato, T. et al., "Effects of Si and Ti Additions on the Nucleation and Phase Stability of the $L1_2$-Type $Al_3Zr$ Phase in Al—Zr Alloys," Mater Sci Forum, 217-222:895-900 (1996).
Seidman, D. N. et al., "Precipitation strengthening at ambient and elevated temperatures of heat-treatable Al(Sc) alloys," Acta Mater, 50:4021-4035 (2002).
Van Dalen, M. E. et al., "Effects of Ti additions on the nanostructure and creep properties of precipitation-strengthened Al—Sc alloys," Acta Mater, 53:4225-4235 (2005).
Wen, S. P. et al., "Synergetic effect of Er and Zr on the precipitation hardening of Al—Er—Zr alloy," Scr Mater, 65:592-595 (2011).
Zhang, Y. et al., "Precipitation evolution of Al—Zr—Yb alloys during isochronal aging," Scr Mater, 69:477-480 (2013).

\* cited by examiner

ALUMINUM-IRON-ZIRCONIUM ALLOYS

The present application is a U.S. national stage of international application no. PCT/US2016/057098, filed on 14 Oct. 2016, which claims the benefit of the filing date of U.S. Ser. No. 62/241,543, filed 14 Oct. 2015.

TECHNICAL FIELD

The present disclosure generally relates to improved aluminum-iron-zirconium alloys that exhibit improved electrical and mechanical properties.

BACKGROUND

It is known to use aluminum or aluminum alloys in many applications as a consequence of aluminum's relatively low density and generally satisfactory electrical and mechanical properties. However, aluminum and certain aluminum alloys suffer from various detriments that impair their use in some applications. For example, certain aluminum conductors can suffer from time consuming and energy-intensive processing steps and can exhibit poor electrical or mechanical properties when used as a conductive element or when used at elevated temperatures. It would therefore be desirable to create an improved aluminum alloy that is easier to produce while also offering improved electrical and mechanical properties.

SUMMARY

In accordance with some embodiments, an aluminum alloy comprises aluminum, iron, zirconium, and an inoculant; wherein the aluminum alloy comprises a plurality of precipitates, and the plurality of precipitates are present in the aluminum alloy at a density of about $10^{21}$ precipitates per $m^3$ or more. In some embodiments, the inoculant comprises one or more of tin, indium, antimony, and magnesium. In some embodiments, the aluminum alloy further comprises silicon. In some embodiments, the inoculant comprises one or more of zinc, gallium, germanium, lead, arsenic, and bismuth. In some embodiments, the innoculent comprising one or more of zinc, gallium, germanium, lead, arsenic, and bismuth, comprises about 0.01% to about 0.2% of the aluminum alloy by weight. In some embodiments, the inoculant comprises at least one Group 3A, 4A, 5A metal or metalloid. In some embodiments, the iron comprises about 0.1% to about 1% of the aluminum alloy by weight. In some embodiments, the iron comprises about 0.3% to about 0.7% of the aluminum alloy by weight. In some embodiments, the zirconium comprises about 0.1% to about 0.5% of the aluminum alloy by weight. In some embodiments, the inoculant comprises about 0.01% to about 0.2% of the aluminum alloy by weight. In some embodiments, the inoculant comprises tin, the aluminum comprises about 99% of the aluminum alloy by weight, the iron comprises about 0.3% to about 0.5% of the aluminum alloy by weight, the zirconium comprises about 0.2% to about 0.4% of the aluminum alloy by weight, and the tin comprises about 0.01% to about 0.2% of the aluminum alloy by weight. In some embodiments, the aluminum alloy further comprises silicon, wherein the silicon comprises about 0.01% to about 0.2% of the aluminum alloy by weight. In some embodiments, the aluminum comprises about 99% of the aluminum alloy by weight, the iron comprises about 0.3% to about 0.5% of the aluminum alloy by weight, the zirconium comprises about 0.2% to about 0.4% of the aluminum alloy by weight, and the inoculant comprises about 0.01% to about 0.2% of the aluminum alloy by weight. In some embodiments, the inoculant comprises tin, the aluminum comprises about 99% of the aluminum alloy by weight, the iron comprises about 0.55% of the aluminum alloy by weight, the zirconium comprises about 0.34% the aluminum alloy by weight, and the tin comprises about 0.1% of the aluminum alloy by weight. In some embodiments, the inoculant comprises tin, the aluminum comprises about 99% of the aluminum alloy by weight, the iron comprises about 0.4% to about 0.5% of the aluminum alloy by weight, the zirconium comprises about 0.25% to about 0.3% of the aluminum alloy by weight, and the tin comprises about 0.05% to about 0.1% of the aluminum alloy by weight. In some embodiments, the aluminum alloy further comprises silicon, wherein the silicon comprises about 0.04% of the aluminum alloy by weight; the inoculant comprises tin, and the tin comprises about 0.07% of the aluminum alloy by weight; the aluminum comprises about 99% of the aluminum alloy by weight; the iron comprises about 0.43% of the aluminum alloy by weight; and the zirconium comprises about 0.27% of the aluminum alloy by weight. In some embodiments, the plurality of precipitates has an average diameter of about 20 nm or less. In some embodiments, the plurality of precipitates has an average diameter of about 10 nm or less. In some embodiments, the plurality of precipitates has an average diameter of about 3 nm to about 7 nm.

In some applications, a cable includes at least one conductive element formed from an aluminum-zirconium alloy. The aluminum-zirconium alloy further includes an inoculant. The at least one conductive element has an ultimate tensile strength of about 120 MPa or more after heat aging for 48 hours at 400° C. and exhibits a stress relaxation time to reach about 85% of an initial stress that is about 2 times longer in duration than a similar aluminum-zirconium alloy formed without an inoculant when measured in accordance to ASTM E328.

In some applications, a conductive element for a cable includes an aluminum-zirconium alloy. The aluminum-zirconium alloy has an ultimate tensile strength of about 140 MPa or more after heat aging for 48 hours at 400° C. and exhibits a stress relaxation time to reach about 85% of an initial stress that is about 2 times longer in duration than a similar aluminum-zirconium alloy formed without an inoculant when measured in accordance to ASTM E328. The aluminum-zirconium alloy includes about 99% by weight aluminum, about 0.3% to about 0.5% by weight iron, about 0.2% to about 0.4% by weight zirconium, and about 0.01% to about 0.2% by weight tin.

In some applications, a method of making a conductive element for a cable includes continuously casting an as-cast shape from an aluminum-zirconium alloy, hot rolling the as-cast shape to form a redraw rod, drawing the redraw rod into a wire, and annealing the wire to form a conductive element. The aluminum-zirconium alloy further includes an inoculant.

DETAILED DESCRIPTION

Figure 1:
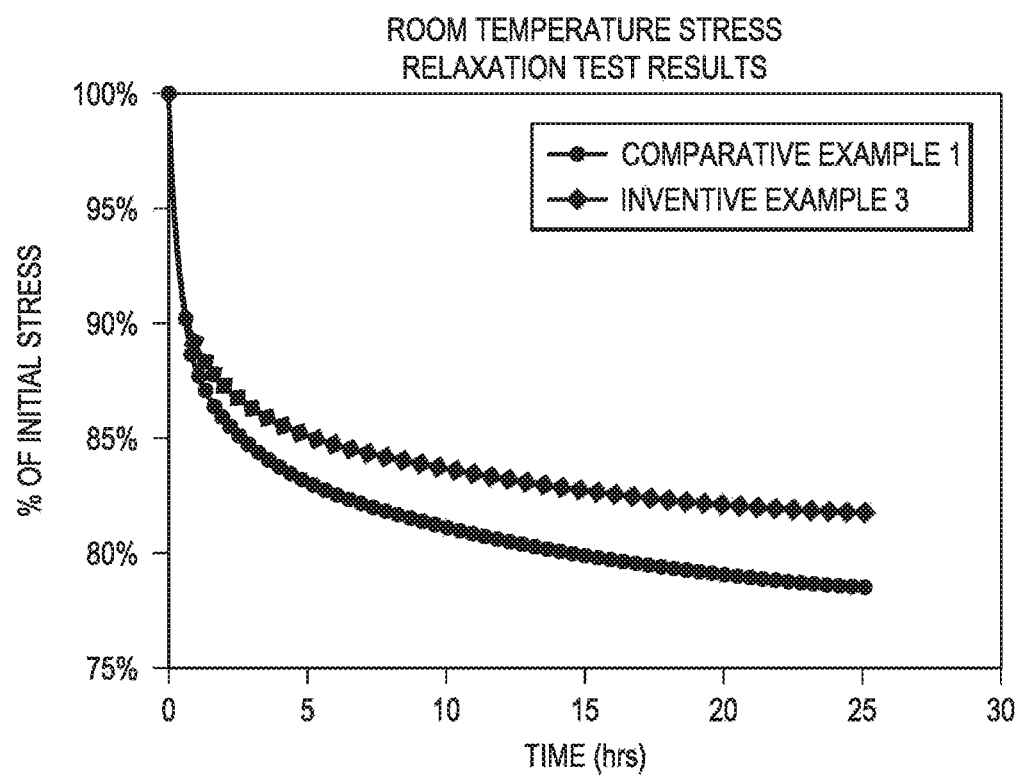
FIG. 1 depicts a graph illustrating the room temperature stress relaxation times of an improved aluminum-zirconium alloy according to one embodiment, and the room temperature stress relaxation time of a conventional aluminum-zirconium alloy.

Aluminum alloys exhibiting improved conductivity and mechanical properties at elevated temperatures can provide numerous benefits when used as conductive elements in cables. In certain embodiments, an improved aluminum alloy exhibiting such features can be an aluminum-zirconium alloy including an inoculant that increases the diffusivity of zirconium in the aluminum. According to certain embodiments, examples of suitable inoculants can include any metal or metalloid that lowers the activation energy required for diffusion in an $\alpha$-Al matrix as compared to the activation energy required for diffusion in an $\alpha$-Al matrix free of an inoculant. Non-limiting examples of such inoculants can include Group 3A, Group 4A and Group 5A metal and metalloids as well as zinc. For example, suitable inoculants that can increase the kinetics of zirconium diffusion in an $\alpha$-Al matrix can include tin, indium, antimony, magnesium, zinc, gallium, germanium, lead, arsenic, bismuth, and in combination with other inoculants, silicon in certain embodiments.

Without being bound by theory, it is believed the inclusion of a suitable inoculant in an aluminum-zirconium alloy increases the diffusivity of the zirconium in the aluminum alloy which causes both supersaturation of zirconium and a decrease in the precipitation temperature of zirconium. As can be appreciated, such diffusivity can allow for precipitation of a large number density of relatively small precipitates using lower temperatures and/or time than a similar aluminum-zirconium alloy without such an inoculant. For example, heat aging of an aluminum-zirconium alloy including an inoculant can be performed at lower temperatures for constant heat aging time than a similar aluminum-zirconium alloy free of an inoculant (e.g., at temperatures about 45° C. lower in certain embodiments) and/or for a shorter duration than a similar aluminum-zirconium alloy free of an inoculant for constant heat aging temperature (e.g., for durations about 50 hours shorter according to certain embodiments). As can be appreciated, an aluminum-zirconium alloy with a larger quantity of smaller precipitates can exhibit greater strength than a similar alloy with larger precipitates. In certain embodiments, the nanoscale precipitates can include $Al_3Zr$ precipitates having an $L1_2$-structure in an $\alpha$-Al (f.c.c.) matrix as well as Al—Zr-Inoculant precipitates.

In certain embodiments, an improved aluminum alloy can be formed predominantly of aluminum (e.g., about 99% by weight aluminum or more), and small quantities of zirconium and an inoculant. For example, suitable aluminum alloys can include, by weight percentage, about 0.1% to about 0.4% zirconium, and about 0.01% to about 0.2% of an inoculant, with the remainder of the aluminum alloy being aluminum and trace quantities of additional elements. Such trace elements can form about 1% or less of the aluminum alloy. For example, one or more of iron, silicon, copper, manganese, magnesium, chromium, zinc, titanium, boron, gallium, vanadium, nickel, antimony, scandium or other elements can be found, or included, in certain aluminum alloys. In certain embodiments including such other elements or impurities, iron can be included at about 0.3% to about 0.7%, by weight percentage; silicon can be included at about 0.06% or less, by weight percentage; copper can be included at about 0.007% or less, by weight percentage; manganese can be included at about 0.005% or less, by weight percentage; magnesium can be included at about 0.015% or less, by weight percentage; chromium can be included at about 0.002% or less, by weight percentage; zinc can be included at about 0.04% or less, by weight percentage; titanium can be included at about 0.008% or less, by weight percentage; boron can be included at about 0.001% to about 0.006% by weight percentage; gallium can be included at about 0.03% or less, by weight percentage; vanadium can be included at about 0.004% or less, by weight percentage; nickel can be included at about 0.03% or less by weight percentage; and any other trace elements can be included at about 0.03% or less individually or at about 0.1% collectively, by weight percentage. Aluminum, zirconium, and an inoculant can constitute the remainder of such aluminum alloys.

In comparison to other known aluminum-zirconium alloys having nanoscale aluminum-zirconium precipitates, the inclusion of an inoculant into the aluminum-zirconium alloy can allow for a reduction in the duration of various heat aging steps used to promote precipitation. For example, the inclusion of tin as an inoculant in an aluminum-zirconium alloy can allow for heat aging steps to have a total duration of about 24 hours or less in certain embodiments, about 12 hours or less in certain embodiments; or about 8 hours or less in certain embodiments. Additionally, the inclusion of an inoculant into an aluminum-zirconium alloy can also promote the formation of precipitates having a smaller diameter than comparable precipitates formed on aluminum-zirconium alloys formed without such an inoculant. Other benefits can also be observed due to the inclusion of an inoculant. For example, wire samples formed of an aluminum-zirconium alloy free of an inoculant can become progressively weaker over the duration of a heat aging protocol. Similar samples including such an inoculant can conversely become stronger over the duration of a heat aging protocol. This difference in strength between the two samples is believed to have been caused by the inability of the inoculant-free aluminum-zirconium alloy sample to produce precipitates as small as the precipitates found in the aluminum alloy having zirconium and an inoculant.

The nanoscale precipitates of an aluminum alloy including both zirconium and an inoculant can have an average diameter of about 100 nanometers ("nm") or less, in certain embodiments; an average diameter of about 20 nm or less, in certain embodiments; an average diameter of about 10 nm or less, in certain embodiments; or an average diameter of about 3 nm to about 7 nm in certain embodiments. As can be appreciated, such average diameters can offer a number of benefits over aluminum alloys having larger precipitates. For example, smaller precipitates can lead to improved strength and heat/creep resistance while maintaining good electrical properties and ductility. These properties can also be enhanced by a high density of precipitates. In certain embodiments, the nanoscale precipitates can be found in a high number density on the aluminum-zirconium alloy and can have, for example, a number density of about $10^{21}$ nanoscale precipitates per $m^3$, or greater.

In certain embodiments, an improved aluminum-zirconium alloy can include iron. Iron, in suitable quantities, can form beneficial microscale channels on the alloy. For example, about 0.3% to about 0.7% iron can cause the formation of microscale channels in an aluminum-zirconium alloy including an inoculant. Such microscale channels, in combination with the nanoscale precipitates, can form beneficial hierarchical microstructures.

For example, $Al_{99\%}Fe_{0.55\%}Zr_{0.34\%}Sn_{0.1\%}$ exhibits a hierarchical microstructure that is highly resistant to creep as a result of Al—Fe intermetallic channels and regions of both high and low density Al—Zr—Sn nanoscale precipitates. Such microstructures defined by the plurality of nanoscale precipitates and channels can allow the aluminum-zirconium alloy to maintain strength over longer periods of time, even at relatively higher temperatures. For example, an aluminum-zirconium alloy cable formed with such microstructures heated to 280° C. for about 1 hour can retain a tensile strength greater than 90% of the original temperature tensile strength before the heat resistance testing when measured in accordance to ASTM B941.

As can be appreciated, the formation of microstructures with nanoscale precipitates on an aluminum-zirconium alloy can also permit the aluminum-zirconium alloy to exhibit various improvements to its mechanical and electrical properties. For example, an aluminum-zirconium alloy including small quantities of an inoculant can, in certain embodiments, exhibit an elongation at break greater than 14.5%, an ultimate tensile strength ("UTS"), after heat aging at about 450° C. for 48 hours, of about 140 MPa or more in certain embodiments, about 130 MPa or more in certain embodiments, and of about 120 MPa or more in certain embodiments. The aluminum-zirconium alloy can exhibit an electrical conductivity compared to copper of about 56% or more as measured in accordance to the International Annealed Copper Standard ("IACS").

Additionally, in certain embodiments, improved aluminum-zirconium alloys described herein can exhibit substantially improved creep performance as compared to similar aluminum alloys without the nanoscale precipitates. As can be appreciated, improved creep performance can facilitate the use of such improved aluminum-zirconium alloys in applications that were previously difficult for pure aluminum or known aluminum alloys to be utilized in.

An improved aluminum-zirconium alloy as described herein can also exhibit improved resistance to stress relaxation resistance. As can be appreciated, stress relaxation is one of the most important concerns in the design of electrical contacts and is defined as the decrease in stress when subject to a constant strain. A conductive element (e.g., wire) formed of improved aluminum-zirconium alloy, $Al_{99\%}Fe_{(0.4-0.5)\%}Zr_{(0.25-0.3)\%}Sn_{(0.05-0.1)\%}$, for example, can exhibit a stress relaxation time to reach about 85% of an initial stress that is about 2 times longer in duration than an aluminum-zirconium alloy formed without an inoculant when measured in accordance to ASTM E328 standards. Both conductive elements were initially stressed to 75% of their respective yield strength values. As can be appreciated, improved resistance to stress relaxation can allow for stronger cables that resist deformation or improved electrical connectors.

In addition to improved stress relaxation resistances, an improved aluminum-zirconium alloy can also exhibit about 40% higher yield stress than a comparative 8000 series aluminum alloy for example, as described by, ASTM Specification B800 and having chemical formula $AlFe_{0.430\%}Zn_{0.020\%}Si_{0.40\%}$. As can be appreciated, such improvements to the yield strength and stress relaxation time can allow for the improved aluminum-zirconium alloy to better withstand higher crimping or terminating forces.

According to certain embodiments, improved aluminum-zirconium alloys described herein can be formed into a conductive element of an electrical cable through one or more wire processing steps. For example, in certain embodiments, the process of producing a conductive element can include the steps of casting an as-cast shape (e.g., a bar), hot rolling the as-cast shape into a redraw rod, and then drawing the redraw rod into a conductive element, such as a wire. This process can be performed continuously.

In certain embodiments, an as-cast shape of an improved aluminum-zirconium alloy can be cast using any known casting method. For example, an $Al_{99\%}Fe_{(0.4-0.5)\%}Zr_{(0.25-0.3)\%}Sn_{(0.05-0.1)\%}$ alloy can be cast by melting the alloy in air at about 800° C. and continuously casting the as-cast shape. As will be appreciated, other casting techniques can be used as known in the art. In certain embodiments, an as-cast shape can subsequently be worked or further formed into a redraw rod using hot rolling techniques prior to wire drawing. As illustration only, a suitable diameter for a redraw rod can be about 0.375" inches in diameter.

The re-draw rod can undergo a wire drawing process to produce a conductive wire or element. Generally, a cold wire drawing process can be utilized to produce wires having excellent electrical and mechanical properties. As can be appreciated, the diameter of the conductive wire can be selected depending upon the electrical and mechanical properties necessary for any specific cabling application. For example, a conductive wire intended for an overhead conductor cable can be relatively thick in diameter while conductive wires for smaller applications can be thinner. In certain embodiments, more than one wire drawing step can also be used to produce a particularly high gauge (small diameter) wire. As known in the art, it is also possible to produce conductive elements having non-circular cross-sectional shapes through known wire drawing and other forming techniques.

In certain embodiments, the formation of nanoscale precipitates on an improved aluminum-zirconium alloy can be enhanced through the use of certain additional steps during the wire processing operations. The additional steps can generally include various heat treatment processes such as peak aging and annealing processes. Heat treatment and subsequent cooling can promote precipitation of the nanoscale precipitates. As can be appreciated, the additional steps can also improve the mechanical and electrical properties of the aluminum-zirconium alloy. Advantageously, the heat treatment steps used to promote the precipitation of the present nanoscale precipitates can be shorter in duration and can be performed at lower temperatures than known comparable heat treatment applications for other conventional aluminum alloys.

A peak aging step (sometimes referred to as precipitation hardening process) can generally refer to the use of elevated heat to produce fine particles of a second phase in an alloy. In the case of the improved aluminum-zirconium alloys described herein, the desired nanoscale precipitates can be formed during peak aging. Peak aging can be performed as a stand-alone heat treatment on a redraw rod, or combined with the annealing step of an intermediate or finished drawn wire. Peak aging can be conducted with any suitable heating system such as resistance furnace, induction furnace, or gas-fired furnace. For an aluminum-zirconium alloy formed of $Al_{99\%}Fe_{(0.4-0.5)\%}Zr_{(0.25-0.3)\%}Sn_{(0.05-0.1)\%}$, a peak aging process can involve heating the redraw rod after hot rolling to an elevated temperature between about 400° C. to about 450° C. in certain embodiments, and between about 425° C. to about 450° C. in certain embodiments. The duration of a peak aging step can be about 24 hours to about 48 hours in certain embodiments and about 24 hours in certain embodiments. In certain embodiments, peak aging of a redraw rod can slightly increase the tensile strength at lower aging temperatures or slightly decrease the tensile strength at higher aging temperatures and can increase the conductivity from about 52% IACS to about 58% IACS.

[0027] According to certain embodiments, a peak aging step can be combined with an annealing step of an intermediate, or finished, drawn wire. The combination of a peak aging step and an annealing step into a single step can promote the formation of nanoscale precipitates while also acting to improve ductility, lower strength and/or hardness, and recover conductivity lost during work-hardening that can occur during a wire drawing process. The combined annealing and peak aging step can occur in air. In certain embodiments, a combined peak aging and annealing step can occur at a temperature between about 300° C. to about 450° C. for a duration between about 3 hours and about 24 hours. In certain embodiments, an annealing step can be performed following wire drawing after peak aging of a redraw rod. In such embodiments, the annealing step can be used to improve ductility, lower strength and/or hardness, and recover conductivity lost during work-hardening that occurs during the wire drawing process. The optional step of peak aging can influence both the temperature and duration of any annealing step. For example, if a peak aging process is performed on a redraw rod, a later annealing step can occur at a lower temperature and/or for a shorter duration of time than a wire annealed without a peak aging step. For example, an $Al_{99\%}Fe_{(0.4-0.5)\%}Zr_{(0.25-0.3)\%}Sn_{(0.05-0.1)\%}$ conductive wire undergoing both peak aging and annealing can use a temperature between about 300° C. and about 400° C. for the annealing step instead of a temperature greater than 400° C. used in a comparable cable having a combined annealing and peak aging step. As can be appreciated, if multiple wire drawing steps are performed, an annealing process can be performed after each such step to improve ductility, lower strength and/or hardness, and recover conductivity lost during work-hardening that occurs during such wire drawing processes.

A non-limiting example of a suitable wire drawing process is disclosed. In the example wire drawing process, a trapezoidal as-cast bar with an about 5.75 in² cross-sectional area can be continuously cast, The trapezoidal as-cast bar can then be rot rolled into a 0.375" redraw rod. The 0.375" redraw rod can be peak-aged for about 48 hours at about 420° C. to form suitable nanoscale precipitates before wire drawing to a 1.6 mm (0.063") intermediate wire. The as-drawn 1.6 mm intermediate wire can then be annealed for about 6 hours at about 400° C. to improve ductility required for further wire drawing. The intermediate wire can then be wire drawn to an about 0.3 mm (0.0118") diameter wire. The as-drawn 0.3 mm wire can subsequently be annealed to further improve ductility, lower strength and/or hardness, and recover conductivity lost during work-hardening associated with the final wire drawing step.

Additional details about suitable aluminum-zirconium alloys and heat treatment steps are disclosed in U.S. Patent App. Publication No. 2015/0259773 A1 which is hereby incorporated by reference in its entirety.

Cables including conductive elements formed from the improved aluminum-zirconium alloys described herein can be used in a variety of applications including, for example, automotive applications, aerospace applications, power transmission applications, household cabling applications, and any other application requiring a lightweight cable. For example, improved aluminum-zirconium alloys described herein can be particularly useful as a power cable in automotive and aerospace power systems including for example, as a battery wire in an electrically powered vehicle. Conductive elements formed from an improved aluminum-zirconium alloy as disclosed herein can be used in wires as small as about 1 μm in diameter in certain embodiments or as large as about 1" in diameter in certain embodiments. For example, aluminum bond wires as small as about 18 μm (0.7 mils) in diameter can be formed in certain embodiments and wire as large as about 4/0 (0.46" or 11.68 mm) in diameter can be formed in certain embodiments.

Generally, the present aluminum-zirconium alloy conductive wires or elements can be utilized similarly to conductive wires or elements produced from known aluminum alloys such as heat resistant aluminum-zirconium alloys and 8000 series aluminum alloys. Certain conventional examples of heat resistant aluminum-zirconium alloys are described in ASTM Specification B941 and can have, for example, the chemical formula $AlZr_{0.287\%}Fe_{0.206\%}Si_{0.045\%}$. As will be appreciated however, the improved creep resistance and stress relaxation resistance of the improved aluminum-zirconium alloys described herein can allow for improved performance of the cables as well as new uses.

Cables including conductive elements formed of the improved aluminum-zirconium alloys described herein can generally be constructed using known techniques and cable geometries by replacing the existing conductive elements with the conductive element formed from the improved aluminum-zirconium alloy. For example, simple power cables can be formed by stranding aluminum-zirconium alloy conductive elements and then coating the conductive elements with an insulation layer and/or jacket layer. Any known insulation layer or jacket layer can be utilized as known in the art.

In certain embodiments, conductive elements formed of an improved aluminum-zirconium alloy described herein can be included in overhead conductor cables. As can be appreciated, overhead conductors can be formed in a variety of configurations including aluminum conductor steel reinforced ("ACSR") cables, aluminum conductor steel supported ("ACSS") cables, aluminum conductor composite core ("ACCC") cables and all aluminum alloy conductor ("AAAC") cables. ACSR cables are high-strength stranded conductors and include outer conductive strands, and supportive center strands. The outer conductive strands can be formed from the improved aluminum-zirconium alloys described herein. The center supportive strands can be steel and can have the strength required to support the more ductile outer conductive strands. ACSR cables can have an overall high tensile strength. ACSS cables are concentric-lay-stranded cables and include a central core of steel around which is stranded one, or more, layers of the improved aluminum-zirconium alloy wires. ACCC cables, in contrast, are reinforced by a central core formed from one, or more, of carbon, glass fiber, or polymer materials. A composite core can offer a variety of advantages over an all-aluminum or steel-reinforced conventional cable as the composite core's combination of high tensile strength and low thermal sag enables longer spans. ACCC cables can enable new lines to be built with fewer supporting structures. AAAC cables can be made with the improved aluminum-zirconium alloy wires. ACSR, ACSS, ACCC, and AAAC cables can be used as overhead cables for overhead distribution and transmission lines.

Composite core conductors are useful due to having lower sag at higher operating temperatures and their higher strength to weight ratio. Non-limiting examples of composite cores can be found in U.S. Pat. Nos. 7,015,395, 7,438, 971, 7,752,754, U.S. Patent App. No. 2012/0186851, U.S.

Pat. Nos. 8,371,028, 7,683,262, and U.S. Patent App. No. 2012/0261158, each of which are incorporated herein by reference.

Beneficial properties of the improved aluminum-zirconium alloys described herein can also facilitate the formation of bonding wires from the described alloys. As can be appreciated, bonding wires are used to facilitate the electrical interconnection of one or more components across relatively short distances. For example, boding wires can be used for the interconnection of a microprocessor (microelectronic device) to a microprocessor package or printed circuit board, a battery cell to another battery cell, or can be used in down-hole drilling electronics. Suitable bonding wires are formed of metals and metal alloys which exhibit a variety of useful properties such as good bonding strength to substrates, and resistance to heat, fatigue, and creep. The improved aluminum-zirconium alloys described herein can exhibit a good balance of these properties and wires formed of the improved alloys can exhibit better endurance performance than wires formed of pure aluminum.

For example, bonding wires formed of the aluminum-zirconium alloys described herein can demonstrate good results when tested according to the heat aging processes described in ASTM B941, can resist fatigue failure for at least about $10^6$ cycles at 85 MPa of applied stress when tested in accordance to ASTM E466, and can exhibit a creep rate of about 50% an hour or less when subjected to 50 MPa of applied stress at a temperature of 185° C. when tested in accordance to ASTM E139. In certain embodiments, the described bonding wires can resist fatigue failure for at least about $10^7$ cycles at 85 MPa of applied stress when tested in accordance to ASTM E466. In certain embodiments, the described bonding wires can exhibit a creep rate of about 25% an hour or less when subjected to 50 MPa of applied stress at a temperature of 185° C. when tested in accordance to ASTM E139 and, in certain embodiments, can exhibit a creep rate of about 15% an hour or less.

The ASTM B941 standard provides guidance on sample preparation and heat aging testing protocol for heat resistant aluminum-zirconium round wires. Aluminum-zirconium cables described herein demonstrated an ultimate tensile strength value after heat aging for 1 hour at 280° C. of about 90% or more of the unaged ultimate tensile strength value when tested in accordance to ASTM B941. In certain embodiments, about 95% or more of the unaged ultimate tensile strength was retained. In certain embodiments, about 99% or more of the ultimate tensile strength was retained.

EXAMPLES

Table 1 depicts the compositions of several Example aluminum alloys. Comparative Examples 1 and 2 are 8000 series aluminum alloy and heat resistant aluminum-zirconium alloy respectively. Inventive Examples 3 and 4 depict aluminum-zirconium alloys including a tin inoculant. The Example aluminum alloys depicted in Table 1 were processed into wires to evaluate various physical and electrical properties exhibited by the alloys.

TABLE 1

| Alloy | Fe | Zr | Sn | Other Elements | | | | | Al and Unavoidable Impurities |
| --- | --- | --- | --- | --- | --- | --- | --- | --- | --- |
| | | | | Si | Zn | Ti | Ga | V | |
| Comparative Example 1 (8000 series aluminum alloy) | 0.430% | — | — | 0.040% | 0.020% | 0.01% | 0.01% | — | Remainder |
| Comparative Example 2 (Heat resistant aluminum-zirconium alloy | 0.206% | 0.287% | — | 0.045% | 0.010% | 0.01% | 0.01% | 0.01% | Remainder |
| Inventive Example 3 | 0.430% | 0.300% | 0.100% | 0.040% | 0.020% | — | — | — | Remainder |
| Inventive Example 4 | 0.431% | 0.266% | 0.072% | 0.043% | 0.01% | 0.01% | 0.01% | 0.01% | Remainder |

Table 2 depicts the results of testing 3.175 mm wires formed of the aluminum alloys of Comparative Example 1 and Inventive Example 3. The wires of each Example aluminum alloy were evaluated for elongation at break, ultimate tensile strength ("UTS"), conductivity, and stress relaxation at room temperature. Stress relaxation time was measured in accordance with ASTM E328.

TABLE 2

| ID | Elongation (%) | UTS (MPa) | Conductivity at 20° C. (% IACS) | Stress Relaxation Time* (hours)) |
| --- | --- | --- | --- | --- |
| Comparative Example 1 | 12-16 | 94-117 | 62.0-62.6 | 2.7 (85% of initial stress) 15.1 (80% of initial stress) |
| Inventive Example 3 | 14.9-15.7 | 140-142 | 58.2-60.4 | 5.5 (85% of initial stress) 59.7 (80% of initial stress) |

As depicted in Table 2 and FIG. 1, the wires formed of the alloy of Inventive Example 3 exhibits superior ultimate tensile strength and stress relaxation compared to the wires formed of the aluminum alloy of Comparative Example 1.

FIG. 1 further depicts the room temperature stress relaxation results of the wires formed of Comparative Examples 1 and Inventive Example 3 evaluated in Table 2. As illustrated by FIG. 1, the wires formed of Inventive Example 3 take about twice as long as the wires formed of Comparative Example 1 to relax to 85% of the initial stress (5.5 hours compared to 2.7 hours). The initial stress was set at 75% of the yield stress in each case. This difference in stress relaxation time increases with increasing time. For example, the wires formed of Inventive Example 3 take about 4 times as long as the wires formed of Comparative Example 1 to relax to 80% of the initial stress (extrapolated to 59.7 hours compared to 15.1 hours).

Table 3 depicts the heat aging performance of 9,525 mm redraw rods formed from the aluminum alloys of Comparative Example 2 and Inventive Example 4. The heat aging performance details the UTS and IACS conductivity of the redraw rods after heat aging at temperatures of about 400° C. for 8 hours, 24 hours, and 48 hours. Ultimate tensile strength was determined by measuring the Vickers hardness in accordance to ASTM E92 and then correlating the ultimate tensile strength from the Vickers hardness value by multiplying by about ⅓.

TABLE 3

| Aging Time (hours) | UTS (MPa) | | | Conductivity at 20° C. (% IACS) | | |
|---|---|---|---|---|---|---|
| | Comparative Example 2 | Inventive Example 4 | % Different | Comparative Example 2 | Inventive Example 4 | % Different |
| 0 | 137 | 155 | 12.6 | 52.4 | 50.4 | −3.8 |
| 8 | 124 | 145 | 16.7 | 55.3 | 53.3 | −3.6 |
| 24 | 136 | 164 | 20.6 | 56.2 | 55.6 | −1.1 |
| 48 | 125 | 163 | 29.8 | 57.7 | 57.2 | 0.0 |
| % Improvement/drop after 48 hours | −8.7 | 5.2 | | 10.1 | 13.5 | |

As depicted in Table 3, redraw rods formed of the aluminum alloys of Inventive Example 4 exhibit improved properties after heat aging and the redraw rods match or exceed the properties of the redraw rods formed from the aluminum alloys of Comparative Example 2. For example, the redraw rods formed of the aluminum alloy of Inventive Example 4 exhibit a superior UTS both in absolute values as well as improvement after heat aging. The redraw rods formed of Inventive Example 4 also match the IACS conductivity of the redraw rods formed from the aluminum alloy of Comparative Example 2 after heat aging for 48 hours.

Isochronal Aging Performance

Table 4 depicts the shift in peak aging properties for 38.1 mm (1.5") as-cast rods formed from the aluminum alloys of Comparative Example 5 and Inventive Example 6 after heat aging for a constant time. The as-cast rods formed from Comparative Example 5 and Inventive Example 6 differ in their inclusion of a tin inoculant. The aluminum alloy of Comparative Example 5 is $AlFe_{0.55}Zr_{0.34}$ while the aluminum alloy of Inventive Example 6 is $AlFe_{0.55}Zr_{0.34}Sn_{0.1}$. Ultimate tensile strength was determined by measuring the Vickers hardness in accordance to ASTM E92 and then correlating the ultimate tensile strength from the Vickers hardness value by multiplying by about ⅓.

TABLE 4

| | Comparative Example 5 | Inventive Example 6 |
|---|---|---|
| Peak Aging Temperature (° C.) | 475 | 430 |
| UTS (MPa) | | |
| Initial | 92 | 110 |
| At peak aging temperature | 153 | 165 |
| Conductivity (% IACS) | | |
| Initial | 50 | 51.5 |
| At peak aging temperature | 57 | 57.5 |

As depicted by Table 4, the as-cast rods formed of Inventive Example 6 exhibit a higher initial UTS before heat aging (110 MPa vs 92 MPa), a higher peak UTS after heat aging (165 MPa vs 153 MPa), and achieve the peak UTS at a lower heat aging temperature than the as-cast rods formed of Comparative Example 5 (430° C. vs. 475° C.). The as-cast rods formed of Inventive Example 6 exhibit a 50.0% increase in UTS after heat aging. Similar trends are also seen for the conductivity of as-cast rods formed of Inventive Example 6.

Constant Temperature Aging Performance

Table 5 depicts the UTS and conductivity of an as-cast 38.1 mm (1.5") rod formed of the alloys of Comparative Example 5 and Inventive Example 6 after undergoing heat aging at a constant temperature of 450° C. As illustrated by Table 5, the as-cast rods formed of Inventive Example 6 exhibit a higher initial UTS and conductivity than the as-cast rods formed of Comparative Example 5 and achieves these benefits with a shorter heat aging duration. After heat aging, the as-cast rods formed of Inventive Example 6 exhibit a 30.4% increase in UTS. Ultimate tensile strength was determined by measuring the Vickers hardness in accordance to ASTM E92 and then correlating the ultimate tensile strength from the Vickers hardness value by multiplying by about ⅓.

TABLE 5

| | Comparative Example 5 | Inventive Example 6 |
|---|---|---|
| Peak Aging Time | 80 hours | 30 hours |
| UTS (MPa) | | |
| Initial | 87 | 115 |
| At Peak Aging Time | 127 | 150 |

TABLE 5-continued

|  | Comparative Example 5 | Inventive Example 6 |
|---|---|---|
| Conductivity (% IACS) |  |  |
| Initial | 49 | 51.5 |
| At Peak Aging Temperature | 59 | 59.5 |

Table 6 depicts the effect of tin on UTS & conductivity of 9.5 mm redraw rods after heat aging at 400° C. for several periods of time. Table 6 includes redraw rods formed of Comparative Example 7 and Inventive Example 8. The aluminum alloy of Comparative Example 7 is $AlFe_{0.43}Zr_{0.3}$ and the aluminum alloy of Inventive Example 8 is $AlFe_{0.43}Zr_{0.3}Sn_{0.072}$. Ultimate tensile strength was determined by measuring the Vickers hardness in accordance to ASTM E92 and then correlating the ultimate tensile strength from the Vickers hardness value by multiplying by about ⅓.

TABLE 6

|  | UTS (MPa) | | | Conductivity at 20° C. (% IACS) | | |
|---|---|---|---|---|---|---|
| Aging Time (hours) | Comparative Example 7 | Inventive Example 8 | % Difference | Comparative Example 7 | Inventive Example 8 | % Difference |
| 0 | 156 | 169 | 8.3 | 53.7 | 50.6 | −5.8 |
| 8 | 136 | 158 | 16.1 | 55.6 | 53.4 | −3.9 |
| 24 | 135 | 179 | 17.0 | 56.7 | 55.6 | −1.9 |
| 48 | 138 | 178 | 29.0 | 57.2 | 57.3 | +0.2 |
| % Improvement/ drop after 48 hours | −11.6 | 5.3 |  | 6.5 | 13.2 |  |

As depicted by Table 6, the redraw rods of Inventive Example 8, including 0.072% tin, enabled a UTS peak to occur after about 24 hours of heat aging. The redraw rods of Comparative Example 7, formed without tin, had a UTS peak occur only after 48 hours of heat aging. Furthermore, the addition of 0.072% tin increased the UTS by about 29% after 48 hours of aging, with only minor changes in the electrical conductivity.

Table 7 depicts the elongation at break, ultimate tensile strength, conductivity, and creep of 0.3 mm diameter bonding wires formed of pure aluminum (99.99% Al minimum and labeled as Comparative Example 9), and from the aluminum alloy of Inventive Example 4. As illustrated by Table 7, the wires formed of Inventive Example 4 exhibit improved UTS, elongation at break, and a creep rate at 185° C. that is about 21 times or more slower than the creep rate of wires formed of 99.99% pure aluminum at an applied stress of 30 to 70 MPa when measured in accordance to ASTM E139.

TABLE 7

| Example | Elongation (%) | UTS (MPa) | Conductivity at 20 C. (% IACS) | Creep Rate at 185° C. (%/hr) |
|---|---|---|---|---|
| Comparative Example 9 (Pure Aluminum) | 11.4 | 103.8 | 63.5 | 7 (30 MPa Applied Stress) 210 (50 MPa Applied Stress) 2500 (70 MPa Applied Stress) |

TABLE 7-continued

| Example | Elongation (%) | UTS (MPa) | Conductivity at 20 C. (% IACS) | Creep Rate at 185° C. (%/hr) |
|---|---|---|---|---|
| Inventive Example 4 | 12.4 | 110 | 59.9 | 0 (30 MPa Applied Stress) 10 (50 MPa Applied Stress) 110 (70 MPa Applied Stress) |

As depicted in Table 8, additional bonding wire performance was evaluated using wires formed of 99.99% pure aluminum (Comparative Example 9) and the aluminum alloy of Inventive Example 4. The wires formed of Comparative Example 9 were 380 μm in diameter while the wires formed of Inventive Example 4 were 392 μm in diameter.

TABLE 8

| Example | UTS (MPa) | Conductivity at 20 C. (% IACS) |
|---|---|---|
| Comparative Example 9 (Pure Aluminum) - 380 μm wire | — | 64.6 |
| Inventive Example 4 - 392 μm wire | 88.9 | 59.0 |

Heat Aging Performance

Table 9 depicts the UTS of 300 μm diameter wires formed from the aluminum alloy of Inventive Example 4 and 99.99% pure aluminum (Comparative Example 9) after heat aging at 300° C. As illustrated by Table 9, the wires formed of Inventive Example 4 exhibit a UTS drop of about 4% after heat aging for 24 hours while the wires formed of pure aluminum exhibit a UTS drop of about 25%. Ultimate tensile strength was determined by measuring the Vickers hardness in accordance to ASTM E92 and then correlating the ultimate tensile strength from the Vickers hardness value by multiplying by about ⅓.

TABLE 9

| Ultimate Tensile Strength (MPa) after Heat Aging for: | Inventive Example 4 | Comparative Example 9 (Pure Aluminum) |
|---|---|---|
| Initial | 111.0 | 95.1 |
| 2 hours | 106.2 | 73.1 |
| 5 hours | 106.9 | 71.0 |
| 24 hours | 106.2 | 71.7 |

The 300 μm diameter wires formed of Inventive Example 4 also demonstrated excellent results when tested in accordance to ASTM B941 heat resistance standards. The ASTM B941 standard describes heat aging of a sample at 280° C. for 1 hour and then cooling the sample to room temperature. The 300 μm wires formed of Inventive Example 4 retained greater than 99% of the room temperature UTS when tested in accordance to ASTM B941.

Fatigue Performance

Figure 2:
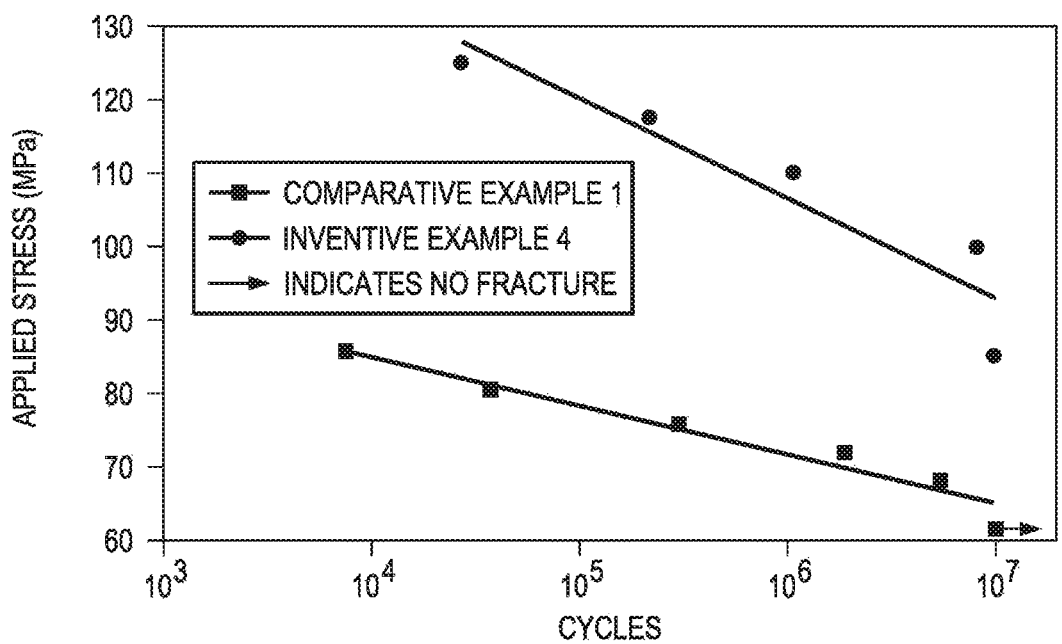
FIG. 2 depicts a graph illustrating the room temperature fatigue properties of an improved aluminum-zirconium alloy according to one embodiment, and the room temperature fatigue properties of a conventional 8000-series aluminum alloy.

FIG. 2 depicts the room temperature fatigue properties of 1.6 mm wire formed from the aluminum alloys of Comparative Example 1 and Inventive Example 4. As depicted by FIG. 2, the wires formed from the aluminum alloy of Inventive Example 4 exhibited superior fatigue performance compared to the wires formed from the aluminum alloy of Comparative Example 1 when tested in accordance to ASTM E466.

Bond Performance for Bonding Wire Applications

Figure 3:
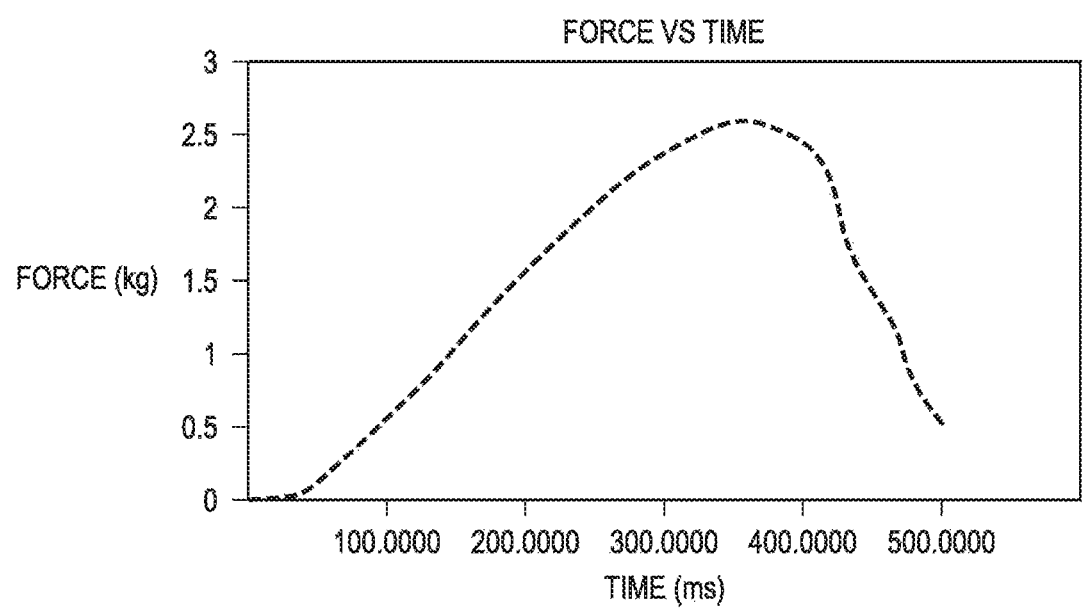
FIG. 3 depicts a graph illustrating the results of a 20 mil (0.508 mm) shear test demonstrating the bonding performance of an improved aluminum-zirconium alloy according to one embodiment.

An industrial heavy-aluminum wire wedge bonding machine (Hesse Mechatronics BJ939) was used to assess the bonding performance of bonding wires formed of the Example aluminum alloys. The performance was evaluated assessing about 1000 bonds made with a 2-step ultrasonic voltage application. Bonding performance of wires formed of the aluminum alloy of Inventive Example 4 were found to match or exceed the performance of identical wires formed of pure aluminum and other typical aluminum bonding wire alloys (such as Al-1% Si & Al—Mg). The wires formed of Inventive Example 4 did not exhibit any bond failures (including any heel cracks, abnormal tail lengths, bond ears, or deformed areas) with proper setting of relevant bond parameters (ultrasonic power, bonding force, ultrasonic duration, and loop height). Furthermore, the bonds performed very well in standard pull tests and shear tests. For example, bonds made with 387 μm wire formed of Inventive Example 4 survived a 1000 cN pull test conducted in accordance to ASTM F459 and greater than a 2500 gram-force in a 20 mil (0.508 mm) shear test conducted in accordance JESD22-B116A. The results of the shear test are depicted in FIG. 3.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of ordinary skill in the art. Rather it is hereby intended the scope be defined by the claims appended various embodiments. The scope is, of course, not limited to the examples or embodiments set forth herein, but can be employed in any number of applications and equivalent articles by those of hereto.

What is claimed is:

1. An aluminum alloy comprising:
   0.3% to about 0.7% iron by weight;
   about 0.1% to about 0.5% zirconium by weight;
   about 0.01% to about 0.2% of an inoculant by weight;
   about 0.01 to 0.1% silicon by weight; and aluminum as the remainder;
   wherein the aluminum alloy comprises a plurality of nanoscale precipitates having an $L1_2$-structure in an α-Al face centered cubic matrix, the plurality of precipitates comprising $Al_3Zr$ precipitates, and the plurality of precipitates being present in the aluminum alloy at a density of about $10^{21}$ precipitates per $m^3$ or more.

2. The aluminum alloy of claim 1, wherein the inoculant comprises one or more of tin, indium, antimony, and magnesium.

3. The aluminum alloy of claim 1, wherein the inoculant comprises one or more of zinc, gallium, germanium, lead, arsenic, and bismuth.

4. The aluminum alloy of claim 1, wherein the inoculant comprises at least one Group 3A, 4A, 5A metal or metalloid.

5. The aluminum alloy of claim 1, wherein
   the inoculant comprises tin;
   the aluminum comprises about 99% of the aluminum alloy by weight;
   the iron comprises 0.3% to about 0.5% of the aluminum alloy by weight;
   the zirconium comprises about 0.2% to about 0.4% of the aluminum alloy by weight; and
   the tin comprises about 0.01% to about 0.2% of the aluminum alloy by weight.

6. The aluminum alloy of claim 1, wherein
   the aluminum comprises about 99% of the aluminum alloy by weight;
   the iron comprises 0.3% to about 0.5% of the aluminum alloy by weight;
   the zirconium comprises about 0.2% to about 0.4% of the aluminum alloy by weight; and
   the inoculant comprises about 0.01% to about 0.2% of the aluminum alloy by weight.

7. An aluminum alloy comprising:
   about 99% aluminum by weight;
   about 0.55% iron by weight;
   about 0.34% zirconium by weight; and
   inoculant, wherein the inoculant comprises tin, and the tin comprises about 0.1% of the aluminum alloy by weight;
   wherein the aluminum alloy comprises a plurality of nanoscale precipitates having an $L1_2$-structure in an α-Al face centered cubic matrix, the plurality of precipitates comprising $Al_3Zr$ precipitates, and the plurality of precipitates being present in the aluminum alloy at a density of about $10^{21}$ precipitates per $m^3$ or more.

8. An aluminum alloy comprising:
   about 99% aluminum by weight;
   about 0.4% to about 0.5% iron by weight;
   about 0.25% to about 0.3% zirconium by weight; and inoculant, wherein the inoculant comprises tin, and the tin comprises about 0.05% to about 0.1% of the aluminum alloy by weight;

wherein the aluminum alloy comprises a plurality of nanoscale precipitates having an $L1_2$-structure in an α-Al face centered cubic matrix, the plurality of precipitates comprising $Al_3Zr$ precipitates, and the plurality of precipitates being present in the aluminum alloy at a density of about $10^{21}$ precipitates per $m^3$ or more.

9. An aluminum alloy comprising:
about 99% aluminum by weight;
about 0.43% iron by weight;
about 0.27% zirconium by weight;
about 0.04% silicon by weight; and
inoculant, wherein the inoculant comprises tin, and the tin comprises about 0.07% of the aluminum alloy by weight;

wherein the aluminum alloy comprises a plurality of nanoscale precipitates having an $L1_2$-structure in an α-Al face centered cubic matrix, the plurality of precipitates comprising $Al_3Zr$ precipitates, and the plurality of precipitates being present in the aluminum alloy at a density of about $10^{21}$ precipitates per $m^3$ or more.

10. The aluminum alloy of claim 1, wherein the plurality of precipitates has an average diameter of about 20 nm or less.

11. The aluminum alloy of claim 1, wherein the plurality of precipitates has an average diameter of about 10 nm or less.

12. The aluminum alloy of claim 1, wherein the plurality of precipitates has an average diameter of about 3 nm to about 7 nm.

13. The aluminum alloy of claim 3, wherein the inoculant comprises about 0.05% to about 0.1% of the aluminum alloy by weight.

14. The aluminum alloy of claim 1, wherein the plurality of precipitates comprises Al—Zr—X precipitates, X being the inoculant.

15. The aluminum alloy of claim 1, wherein the silicon comprises about 0.04% of the aluminum alloy by weight.

16. The aluminum alloy of claim 7, further comprising silicon, wherein the silicon comprises about 0.01% to about 0.2% of the aluminum alloy by weight.

17. The aluminum alloy of claim 7, wherein the plurality of precipitates has an average diameter of about 20 nm or less.

18. The aluminum alloy of claim 7, wherein the plurality of precipitates has an average diameter of about 10 nm or less.

19. The aluminum alloy of claim 7, wherein the plurality of precipitates has an average diameter of about 3 nm to about 7 nm.

20. The aluminum alloy of claim 8, further comprising silicon, wherein the silicon comprises about 0.01% to about 0.2% of the aluminum alloy by weight.

21. The aluminum alloy of claim 8, wherein the plurality of precipitates has an average diameter of about 20 nm or less.

22. The aluminum alloy of claim 8, wherein the plurality of precipitates has an average diameter of about 10 nm or less.

23. The aluminum alloy of claim 8, wherein the plurality of precipitates has an average diameter of about 3 nm to about 7 nm.

24. The aluminum alloy of claim 1, wherein the iron comprises 0.35% to about 0.7% of the aluminum alloy by weight.

* * * * *